United States Patent [19]

Campbell et al.

[11] Patent Number: 5,371,744
[45] Date of Patent: Dec. 6, 1994

[54] SYSTEM AND METHOD FOR ENUMERATING ALL ACYCLIC PATHS IN A PROCESSING SYSTEM FOR RECONFIGURATION AND FAULT TOLERANCE

[75] Inventors: Michael L. Campbell; Michael W. Yung, both of Los Angeles, Calif.

[73] Assignee: Hughes Aircraft Company, Los Angeles, Calif.

[21] Appl. No.: 855,401

[22] Filed: Mar. 23, 1992

[51] Int. Cl.$^5$ .............................................. G06F 13/00
[52] U.S. Cl. ..................... 371/8.2; 395/200; 371/11.2; 371/20.1
[58] Field of Search ............... 371/8.2, 8.1, 9.1, 11.2, 371/11.3, 20.1; 395/200, 325, 575

[56] References Cited

U.S. PATENT DOCUMENTS

| | | | |
|---|---|---|---|
| 4,875,037 | 10/1989 | Escolar | 371/8.2 |
| 4,993,015 | 2/1991 | Fite, Jr. | 371/8.2 |
| 5,125,076 | 6/1992 | Faber et al. | 371/8.2 |
| 5,257,266 | 10/1993 | Maki | 371/8.2 |

OTHER PUBLICATIONS

*The Design and Analysis of Computer Algorithms,* by Aho, Hopcroft & Ullman, published by Addison-Wesley, Reading Mass., 1974, pp. 195–200; pp. 44–50, Sections 2.1–2.3; pp. 111–113, Section 4.2.

"Hierarchical Fault Tolerance for 3D Micro Electronics", M. J. Campbell et al., IEEE International Conf. on WSI, Jan. 1990, San Francisco.

Abstract, HFTM Workshop Jun. 1989, "Fault Tolerance in the Hughes 3-D Computer", M. Little et al.

*Primary Examiner*—Vincent P. Canney
*Attorney, Agent, or Firm*—Vijayalakshmi D. Duraiswamy; Wanda K. Denson-Low

[57] ABSTRACT

A system (30) and method is provided for enumerating acyclic paths in an information processing system. The system (30) incorporates multiple processor nodes (18) or functional units interconnected by point-to-point links (20). The hardware of the information processor is represented as a mixed graph with graph nodes (32) for processors and with graph edges (34) representing communication links (20). All the useful paths from the source nodes of the data to the destination nodes of the data are determined in accordance with the system and method of the present invention. These paths are then stored as a list in a table indexed by the source and destination nodes. Thus, when the need for a interprocessor communication path arises, the table can be consulted to find a permissible path. The system (30) efficiently performs interprocessor communication routing and can be utilized in real time.

13 Claims, 5 Drawing Sheets

```
1.   FOR I := V_I → V_N  DO
2.     FOR J := V_I → V_N  DO
3.       IF ( I≠J ) AND (THERE IS
4.           AN EDGE I→J  OR I↔J )
5.         THEN C[I →⁰ J] := {(I,J)}
6.   FOR K := I → N  DO
7.     FOR I := V_I → V_N  DO
8.       FOR J := V_I → V_N  DO
9.         IF ( I≠J )
10.          THEN ⎡ C[I →ᵏ J] :=
11.               | C[I →^{k-1} J]  U
12.               | C[I →^{k-1} K] · C[K →^{k-1} J] ;
13.               | PURGE ACYCLIC PATHS FROM
14.               ⎣ C[I →ᵏ J]
                  WHERE "." REPRESENTS SET
                  CONCATENATION AND "U" REPRESENTS
                  SET UNION
15.          ELSE C[I →ᵏ J] := NULL
16.  OUTPUT : C[S →^N D]  CONTAINS ALL
17.              ACYCLIC PATHS FROM SOURCE NODE, S,
18.              TO EACH DESTINATION NODE, D.
```

```
5 ──────── # OF NODES: (1..5)
3 ──────── ID. # OF SOURCE NODE
2 ┐
① ├──── 2 DESTINATIONS ...
② ┘        ... WITH ID #'S 1 & 2
3-4 ┐
3-5 │
4>1 ├── 5 EDGES :  - =) UNDIRECTED
5>2 │              > =) DIRECTED
5-4 ┘
```

PATHS FROM SOURCE 3 TO DEST 1:

| PATH | DESTINATION |
|------|-------------|
| 1    | 1 (3,4)(4,1) |
| 2    | 1 (3,5)(5,4)(4,1) |

PATHS FROM SOURCE 3 TO DEST 2:

| PATH | DESTINATION |
|------|-------------|
| 3    | 2 (3,4)(4,5)(5,2) |
| 4    | 2 (3,5)(5,2) |

PATHS FROM SOURCE 3 TO DEST 3:

PATHS FROM SOURCE 3 TO DEST 4:

| PATH | DESTINATION |
|------|-------------|
| 5    | 4 (3,4) |
| 6    | 4 (3,5)(5,4) |

PATHS FROM SOURCE 3 TO DEST 5:

| PATH | DESTINATION |
|------|-------------|
| 7    | 5 (3,5) |
| 8    | 5 (3,4)(4,5) |

1. FOR I := $V_1 \rightarrow V_N$ DO
2.    FOR J := $V_1 \rightarrow V_N$ DO
3.      IF ( I≠J ) AND (THERE IS
4.        AN EDGE I→J OR I↔J )
5.        THEN $C[I \xrightarrow{0} J] := \{(I,J)\}$
6. FOR K := I → N DO
7.    FOR I := $V_1 \rightarrow V_N$ DO
8.      FOR J := $V_1 \rightarrow V_N$ DO
9.        IF ( I≠J )
10.          THEN $\Big[$ $C[I \xrightarrow{k} J] :=$
11.            $C[I \xrightarrow{k-1} J] \cup$
12.              $C[I \xrightarrow{k-1} K] \cdot C[K \xrightarrow{k-1} J]$ ;
13.            PURGE ACYCLIC PATHS FROM
14.            $C[I \xrightarrow{k} J]$ WHERE "." REPRESENTS SET
            CONCATENATION AND "U" REPRESENTS
            SET UNION 15.          ELSE $C[I \xrightarrow{k} J] :=$ NULL
16. OUTPUT : $C[S \xrightarrow{N} D]$ CONTAINS ALL
17.       ACYCLIC PATHS FROM SOURCE NODE, S,
18.       TO EACH DESTINATION NODE, D.

FIG. 2A.

1. FOR  I,J ≤ N   DO
2. ⌐   C[I $\xrightarrow{0}$ J] := NULL
3. WHILE (READ (EDGE) # GOF)  DO
4. ⌐   C[I $\xrightarrow{0}$ J] := EDGE
5.     IF (I = J) ERROR => HALT
6. FOR K = 1 $\to$ N  DO
7. ⌐   FOR I = $V_I \to V_N$  DO
8.        FOR J = $V_I \to V_N$  DO
9.           C[I $\xrightarrow{k}$ J] := C[I $\xrightarrow{k-1}$ J] U
10.              C[I $\xrightarrow{k-1}$ K] · C[K $\xrightarrow{k-1}$ J]
11.          IF (I = J)
12.              C[I $\xrightarrow{k}$ J] := NULL
13. C[I $\xrightarrow{N}$ J] = ALL PATHS I $\to$ J  (ACYCLIC)

FIG. 2B.

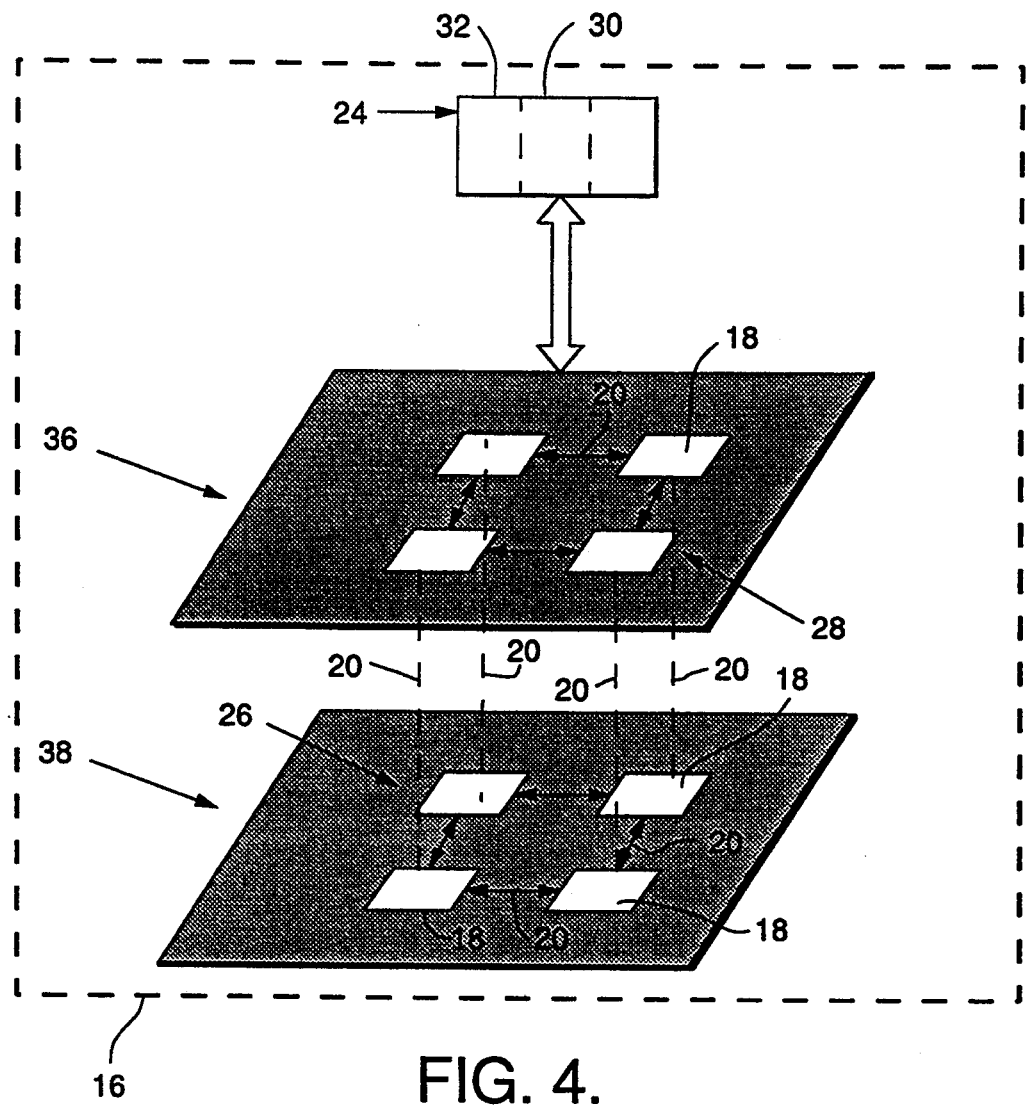
FIG. 4.
FIG. 5.
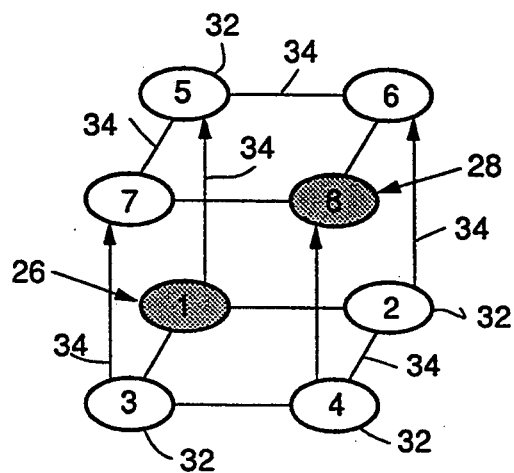

| | |
|---|---|
| 8 | = NUMBER OF NODES |
| 1 | = ID. # OF SOURCE NODE |
| 1 | = NUMBER OF DESTINATION NODES |
| 8 | = ID. # OF DESTINATION NODE |
| 1-2 | = DIRECTED & UNDIRECTED EDGES... |
| 2-4 | |
| 4-3 | |
| 3-1 | |
| 5-6 | |
| 6-8 | |
| 8-7 | |
| 7-5 | |
| 1>5 | |
| 2>6 | |
| 4>8 | |
| 3>7 | |

PATHS FROM SOURCE 1 TO DEST 8:

PATH # 1, TO DEST # 8 : ( 1,3 ) ( 3,4 ) ( 4,8 )

PATH # 2, TO DEST # 8 : ( 1,2 ) ( 2,4 ) ( 4,8 )

PATH # 3, TO DEST # 8 : ( 1,5 ) ( 5,6 ) ( 6,8 )

PATH # 4, TO DEST # 8 : ( 1,3 ) ( 3,4 ) ( 4,2 ) ( 2,8 ) ( 8,8 )

PATH # 5, TO DEST # 8 : ( 1,2 ) ( 2,6 ) ( 6,8 )

PATH # 6, TO DEST # 8 : ( 1,2 ) ( 2,6 ) ( 6,5 ) ( 5,7 ) ( 7,8 )

PATH # 7, TO DEST # 8 : ( 1,3 ) ( 3,4 ) ( 4,2 ) ( 2,6 ) ( 6,5 ) ( 5,7 ) ( 7,8 )

PATH # 8, TO DEST # 8 : ( 1,5 ) ( 5,7 ) ( 7,8 )

PATH # 9, TO DEST # 8 : ( 1,2 ) ( 2,4 ) ( 4,3 ) ( 3,7 ) ( 7,5 ) ( 5,6 ) ( 6,8 )

PATH # 10, TO DEST # 8 : ( 1,2 ) ( 2,4 ) ( 4,3 ) ( 3,7 ) ( 7,8 )

PATH # 11, TO DEST # 8 : ( 1,3 ) ( 3,7 ) ( 7,5 ) ( 5,6 ) ( 6,8 )

PATH # 12, TO DEST # 8 : ( 1,3 ) ( 3,7 ) ( 7,8 )

SYSTEM AND METHOD FOR ENUMERATING ALL ACYCLIC PATHS IN A PROCESSING SYSTEM FOR RECONFIGURATION AND FAULT TOLERANCE

BACKGROUND OF THE INVENTION

1. Technical Field

This invention relates to information processors, and more particularly, to a system and method for enumerating acyclic paths between nodes in an information processor.

2. Discussion

Information processing systems are frequently comprised of nodes, such as processors, which are connected by point-to-point communication links or busses. In such systems, there is a need for techniques which enable the routing of data communications through the network of connections from one node to another, or from many nodes to many nodes. For example, in geographically distributed computer networks, such as the DARPA Internet, or local area networks employing point-to-point connections, data transfers must be rerouted whenever the network configuration is changed, or when a computer node or link fails, or becomes congested with data traffic. Such rerouting is also employed in telephone networks and distributed data base systems.

On a smaller physical scale, data routing must also be performed for multiprocessing computers consisting of many interconnected processors or functional units, such as array processors. This data routing is a normal function during the operation of the machine, and can be performed statically or dynamically. The term "static routing" refers to the process of determining the path for the data transfer at the time the program for the computer is compiled, before the program is executed on the machine. In contrast, the term "dynamic routing" refers to the process of determining the path for the data on the fly, while the program is being executed, in order to adapt to data traffic congestion or node/link failures at run time. Thus, it is seen that the problem of performing routing reconfiguration for multiprocessor arrays is a special case of the more general dynamic interprocessor communication routing problem.

At a higher level of abstraction, a similar routing or path-finding problem arises in large database management systems when a high-level query must be processed, optimized, and mapped onto an underlying set of data base schemata. The query processor must "navigate" through the relationships represented by the database table, entity/relationships, or objects in order to find a path connecting the data fields requested in the query.

One of the main difficulties with the above described path-finding problems is that the problem becomes computationally intractable with large numbers of nodes. Much work has been done in this area to develop short cuts. For example, in the area of fault tolerance various approaches have been suggested for achieving fault tolerance via reconfiguration by switching out faulty processors and switching in good spares under software control while the array processor is in use. Most of these approaches fall into one of two classes: very limited search or exhaustive search. Very limited search suffers from poor performance because it fails to find available configurations when a spare is available; thus the array is declared unrepairable needlessly. Exhaustive search always finds a configuration adopting a spare, if possible, but suffers from very slow running time, which precludes use in real time applications.

Thus, it would be desirable to provide a system and technique which can perform interprocessor communication routing in an efficient manner. Further, it would be desirable to provide such a system which is sufficiently fast to enable use in real time systems for such applications as fault tolerance.

SUMMARY OF THE INVENTION

Pursuant to the present invention, a system and method is provided for enumerating acyclic paths in an information processing system. The system incorporates multiple processor nodes, or functional units interconnected by point-to-point links. The hardware is represented as a mixed graph with graph nodes for processors or functional units, and with graph edges for communication links. All the useful paths from the source nodes of the data to the destination nodes of the data, are determined in accordance with the present invention. These paths are then stored as a list in a table indexed by the source and destination nodes. Thus, when the need for an interprocessor communication path arises, the table can be consulted to find a permissible path. In more detail, the information processing system has N nodes and a plurality of paths between these nodes, the paths including both unidirectional and bidirectional paths. In accordance with one aspect of the present invention, a method is provided for enumerating all acyclic paths between a source node and a plurality of destination nodes. The method includes the steps of creating a list of all paths between nodes $V_N$ which are edges, wherein edges are paths between two nodes which have no intermediate nodes between them. A variable K is assigned to represent intermediate nodes $V_1$ through $V_N$. A variable I is then assigned to represent source nodes $V_1$ though $V_N$ and a variable J is then assigned to represent destination nodes $V_1$ through $V_N$. For a source node I and for a destination node J, where node I does not equal J, all acyclic paths C from source I to destination J going through only nodes numbered less than or equal to K are determined as the union of a first set comprising paths from I to J passing through nodes numbered less than or equal to $K-1$, and a second set comprising the concatenation of the set of paths from I to node K, (passing through nodes numbered less than or equal to $K-1$) and the set of paths from node K to node J (passing through nodes numbered less than or equal to $K-1$), where K is the highest number of a node which a path passes through from the source to the destination. Next, all paths thus determined which are cyclic or redundant are eliminated. Then the above steps are repeated for all paths between the same source node and each other possible destination node J. This process of determining paths between a source node I and all possible destination nodes J is then repeated for all possible source nodes $V_I$. Then, the variable K is incremented by one, and the whole process of determining acyclic paths is repeated, incrementing K after each repetition until K equals N. A table of the acyclic paths is then generated and the information processing system is reconfigured by altering the flow of information within the processor to use one of the paths in the table.

BRIEF DESCRIPTION OF THE DRAWINGS

The various advantages of the present invention will become apparent to one skilled in the art by reading the following specification and by reference to the following drawings in which:

FIGS. 2A and B are a pseudo code representations of some of the steps performed in enumerating all acyclic paths in accordance with the method of the present invention;

FIG. 4 is a diagram of the interconnection topology in an array computer in accordance with the preferred embodiment of the present invention;

FIG. 5 is a mixed graph representation of the interconnection topology depicted in FIG. 3;

FIG. 6 is a listing of the input file of the topology of the mixed graph shown in FIG. 4; and FIG. 7 is a table of all of the acyclic paths determined for the mixed graph in FIG. 4 in accordance with the present invention.

DESCRIPTION OF THE PREFERRED EMBODIMENTS

Figures 1, 3:
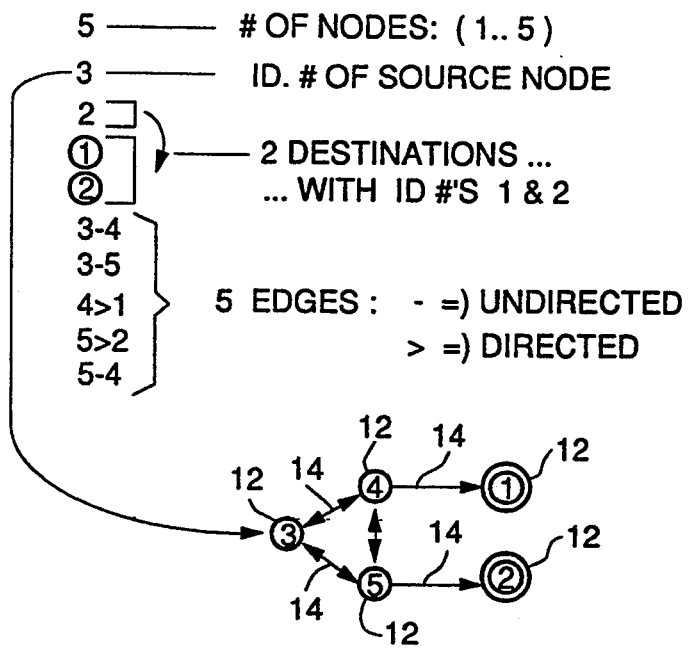
FIG. 1 is a diagram of a mixed graph of five nodes and the representation of their topology in an input file in accordances with the present invention.
FIG. 3 is a listing of the output of all acyclic paths of the mixed graph shown in FIG. 1 determined in accordance with the present invention.

Pursuant to the present invention a system and method to enumerate all acyclic paths in an information processor is provided. The present invention has broad application for path finding or routing tasks in a variety of systems. The general techniques of the present invention will first be explained and following that a specific application of the present invention to reconfiguring a fault tolerant computer will be detailed.

In general terms, assume a program for an information processing system, and assume that the information processing system incorporates multiple processor nodes, or functional units, interconnected by point-to-point links or busses. When the program calls for two data values stored in different nodes to be operated upon together, one value must be routed from its current node to the other node, or both values must be routed to a common destination.

To accomplish this, first the hardware of the system is represented as a mixed graph with graph nodes for processors or functional units and with graph edges for communication links. The present invention is then used to first find all the useful paths from the source node(s) of the data to the destination node of the data. This information is then stored as a list in a table indexed by the source and destination nodes. Thus, when the need for an interprocessor path arises (either statically or dynamically) the table can be quickly consulted to find a permissible path.

In general, most applications allow several alternative paths between a given pair of nodes. At any given time, some of these paths may not be available due to resource conflicts with other paths and intermediate nodes along the way, or due to failures in the system. Whenever multiple paths are available, the problem of choosing the "best" path arises. A simple approach to handle this situation is to identify some "goodness" heuristic for different paths, such as path length, and then sort each list of paths according to decreasing goodness. Then the system can simply choose the first available path on the list each time the table is consulted.

Referring now to FIG. 1, a mixed graph 10 is shown whose nodes 12 represent processing elements (and switching elements), and whose edges 14 represent unidirectional and bidirectional wires or paths. The task to be accomplished is the enumeration of a listing of all possible paths from a designated source node 12 to a designated set of destination nodes 12. It should be noted that paths 14 with double arrows represent undirected (bidirectional) paths. That is, information may flow in either direction, while paths 14 with single arrows represent directed (unidirectional) paths in which information only flows in the direction of the arrow. The input file for the program performing the techniques of the present invention are also shown in FIG. 1. This input file is a representation of the graph 10 shown in FIG. 1.

The first entry "5" represents the number of nodes 12. The next entry "3" is the ID number of the source node, which in this case is node number 3. The next entry 2 is the number of destinations and the next two entries 1 and 2 are the ID numbers of these two destinations 1 and 2. The next five entries indicate the five edges 3-4, 3-5 and 5-4, which are undirected edges as signified by the hyphen. 4>1 and 5>2 are directed edges as indicated by the "greater than" symbol the direction in this example being from 4 to 1 or 5 to 2. The technique of the present invention utilizes an approach which is related to an algorithm found in the book, *The Design and Analysis of Computer Algorithms*, by Aho, Hopcroft, and Ullman published by Addison-Wesley, Reading, Mass. in 1974, pages 195-200 which is herein incorporated by reference. In particular, algorithm 5.5 on page 198 of this reference, has been modified to achieve the advantages of the present invention. The primary modification is to adapt the algorithm to efficiently handle the restriction to acyclic paths in a possibly cyclic mixed graph.

Referring now to FIG. 2, there is shown a pseudo code computer program representation of the method of the present invention for enumerating acyclic paths in a mixed graph. In line 1 the first loop begins. Line 1 assigns variable I to nodes labeled $V_1$ through $V_N$ where N is the total number of nodes and $V_N$ identifies the $N^{th}$ node. The symbol ":=" means assignment. I is considered to be the source node. In line 2 the variable J is assigned to be equal to each node $V_1$ through $V_N$ where J is defined as the destination node.

In brief, line 1 indicates that variable I is first set equal to $V_1$ and the loop below it is completed and then I is set to $V_2$ and the loop below it is completed and this process continues until I is set to $V_N$. Likewise, line 2 indicates that the variable J is set to $V_1$ and the steps below it are performed and then J is set to $V_2$ and those steps performed, etc., until J is equal to $V_N$. In this way lines 1 and 2 will perform the tasks in lines 3, 4, and 5 for every possible combination of nodes I and J. That is, every possible $V_1$ through $V_N$ is paired with every possible $V_1$ through $V_N$.

Line 3 eliminates the case where I and J are the same. Where the source and destination are equal, this would indicate (based on the following steps), that an edge exists that starts from a node and returns back to the same node. This would indicate a self loop (which is not likely to exist in a real situation so it is not considered). Further, this would be a cyclic path and the present invention disregards cyclic paths. Thus, in lines 3, 4 and 5 the program considers cases where I does not equal J and also if there is an edge from I to J which is directed (as indicated by a single arrow) or from I to J which is undirected (indicated by the double arrows) and if so, then the assignment statement in line 5 is executed.

The assignment statement in line 5 says in an array labeled "C" there is a path from I to J of length 1. In line 3 the arrow between the I and J indicates that the path goes from the source I to the destination J and the zero above the line is the value of a variable K which indicates the highest node number of the nodes in the path between I and J. The entry in array C at location C[K=O, I, J] is assigned to be the set ((I, J)). Since K equals zero there are no nodes between I and J and the path is one of length 1. In other words, the path is an edge. Thus, the first loop, that is, lines 1-5 is an initialization of the data structure. It is entering into the array C an indication of where there are edges in the graph and where there are not, as well as taking into account the directionality.

The next loop, in lines 6-15, builds up information about long paths using this information about edges as the starting point. Referring to lines 7 and 8 in FIG. 2A, these two inner loops function similarly to lines 1 and 2, in that they look at every pair of nodes except where I and J are the same. Lines 7-15 are executed for N passes of K, as indicated by the statement in line 6. For the first pass, where K equals 1, the method considers only paths that have intermediate nodes of node number 1, in other words $V_1$. The second time this loop (defined by lines 7-15) is performed, K equals 2, and these steps are performed only for paths that go through intermediate nodes 1 or 2. In the following step K equals 3 and paths going through intermediate nodes 1 or 2 or 3 will be considered, and so on. In the final pass, K equals N and every path will be considered. In brief, as the system goes through the steps between lines 6-15 more and more nodes are allowed to be on the intermediate steps between I and J, the source and destination of the path. This is a way of building up paths in an orderly way. In other words, the first time through lines 7-15, when K equals 1, the only intermediate node between I and J that is allowed is $V_1$. The next time through, the only nodes that are going to be allowed are $V_1$ and $V_2$ and so on.

Referring to line 10, the expression before the assignment symbol can be read "I to J via K". This expression, I to J via K, is a way of saying the set of paths that go from I to J via K, means passing through nodes numbered K or less. This set consists of two kinds of paths, one is the kind to the left of the set union ("U") symbol in line 11 and the other set comprising the expression in line 12. In line 11, C [I to J via K−1] means paths going from I to J without going through any nodes numbered higher than K−1. This expression would represent all of the paths found in the previous pass through the main loop.

The reasoning behind this step is that one way to be assured of going from I to J without passing through a node numbered higher than K is to first look at paths that do not pass through any nodes numbered higher than K−1. Then these paths from the previous pass in line 11 are added to new paths found in the current pass. The new paths are defined in line 12. The interpretation of line 12 is that the way to get from I to J passing through K is to go from I to K and then go from K to J and this guarantees that you have passed through K. An added constraint is that the I to K path does not pass through K again as signified by the K−1 over the arrow. This guarantees that the path passes through node K exactly once. Likewise the K to J path does not go through K again because it is only allowed to pass through nodes numbered K−1 or less. In brief, these steps say that the path from I to J passing through nodes numbered K or less, are either nodes that pass only through nodes numbered K−1 or less or through nodes that pass through K. The dot in line 12 indicates set concatenation with elimination of redundant copies of identical paths. Concatenation accomplishes the combination of all the paths from I to K with all the paths from K to J to achieve the total of all of the paths from I to J. It should be noted however that in performing this concatenation it may be possible to introduce an unintentional cycle. Since cyclic paths are not of interest in the present technique, they should be purged. The sooner they are purged the more efficient the processing will be.

In more detail, when analyzing the paths formed by going from I to K and then from K to J it is possible to have cycles. For example, if I is 1 and J is N, and K is, for example 5, the path will be from 1 to 5 and 5 to N. Taking the case of a node numbered less than K−1 like 3 it is possible that going from I to K you pass through node and then it is possible that going from K to N you also pass through node 3. This would indicate passing through node 3 twice and passing through a node twice indicates the presence of a cycle. Thus, after each concatenation in line 12, cyclic paths are purged as indicated in lines 13 and 14. It is important to purge them immediately because cyclic paths will begin to build up and unnecessarily complicate calculations. It will be appreciated that there are well understood algorithms which easily accomplish the recognition and elimination of cyclic paths at this point. For example, a simple well known algorithm to accomplish this is sequential list searching, as described in Sections 2.1-2.3 (pp. 44-50) of *The Design and Analysis of Computer Algorithms* by A. V. Aho, J. E. Hopcroft, & J. D. Ullman, published by Addison-Wesley, Reading, Mass., in 1974. Sequential searching is adequately fast for applications where the paths are relatively short. Of course, a more efficient technique may be employed depending on the overall system requirements, for example hashing, as described in Section 4.2 (pp. 111-113) of *The Design Analysis of Computer Algorithms* by A. V. Aho, J. E. Hopcroft, & J. D. Ullman, published by Addison-Wesley, Reading, Mass., in 1974, could be employed to speed up the purging operation, if needed. Line 15 simply handles the case where I is equal to J, which is not of interest as discussed above and is assigned to be the null set. After steps 1-15 have been performed N times, K equals N. At this point, every possible path has been considered.

In most applications of the present invention there will be a unique source node of interest. Also, there may be a list of destinations which may range from a single destination to every other node on the graph except the source. Referring to step 16 (which can be read as C of S to D via N), this step indicates all acyclic paths from S (source) to D (destination) passing through nodes numbered N or less. Since there are no nodes numbered higher than N every path is considered. Thus, after steps 1-15 have built up an array of acyclic paths, the paths of interest are those having source S and destination D. It will be appreciated by those skilled in the art that the steps performed in FIG. 2A can readily be implemented in conventional software languages (such as C) based on the disclosure herein.

Referring now to FIG. 2B a refinement of the process described in FIG. 2A is shown. The primary difference with the process shown in FIG. 2B is that in FIG. 2B it is assumed that a list of all the edges is given as a starting point. This is a more realistic assumption in common real world problems. Thus a list of all the edges in the graph is given and the system will process that list by looking at the edges one by one and entering them into the array. In FIG. 2A the process considered each entry in the array and asked if there was an edge that corresponds to each entry. Lines 1 through 5 in FIG. 2A are equivalent to lines 1 through 5 in FIG. 2B, with the distinction being that in FIG. 2A the array was filled in as the graph was searched to find all of the edges; while in 2B a list of edges is processed and edges are added to the array data structure one by one. In a sense, FIG. 2B is better suited to the usual format where the starting point is a mixed graph and a list of edges in that graph. Lines 6–13 in FIG. 2B are equivalent to lines 6–18 in FIG. 2A.

It will be appreciated that "U" denotes the union of two disjoint sets, which can be efficiently implemented by list concatenation. Disjointedness is guaranteed because the term before the U contains no paths through and through $V_k$. Whereas, the other term (following the U) contains only paths passing through and through $V_k$. The dot symbol "." here denotes set concatenation followed by (or with) purging of cyclic or redundant paths from the product set. Hence, the purging steps of FIG. 2A are not explicitly stated in FIG. 2B. It should be noted that scanning the product set incrementally for prefixes in the first factor set eliminates redundant paths and may be more efficient than sequential list searching. It will be appreciated k,y those skilled in the art that the above process can be proved by induction to be complete and correct and that all paths produced are acyclic as required.

Referring now to FIG. 3 a representation of an output resulting from the processing of the graph and input file examples shown in FIG. 1 in accordance with the present invention. In the first section of FIG. 3 the paths from source 3 to destination 1 are listed; following that are listed the paths from source 3 to destination 2; from source 3 to destination 3; from source 3 to destination 4; and from source 3 to destination 5. (Note that the list of acyclic paths from source 3 to destination 3 is empty, as expected, since any such path would be cyclic.) This is the output as produced by the program written to implement the process described on FIG. 2B above.

Referring now to FIGS. 4–7 another preferred embodiment of the present invention is shown. In this embodiment the techniques of the present invention are applied to the specific problem of routing inter processor communication between nodes in a single instruction stream —multiple data stream (SIMD) massively parallel array processor computer known as the "3D Computer". Further details of this computer implemented on a three dimensional stack of silicon wafer scale integrated circuits by Hughes Aircraft Corporation can be found in the article "Hierarchical Fault Tolerance For 3D Micro Electronics", by Michael Campbell, Michael Little, and Michael Yung. This paper was presented at the IEEE International Conference on wafer scale integration, held in San Francisco in January 1990, and is herein incorporated by reference.

This embodiment of the present invention will include a description of the mapping from a specific machine topology to a mixed graph representation. Then the mapping from the mixed graph to the variables of the method of the present invention, shown above in FIGS. 2A and B, will be described. An example of the transformation performed by the present invention is given and the results are then interpreted in terms of the originally posed routing problem.

FIG. 4 shows an array multi-processor, such as the 3D computer 16, which consists of a set of nodes 18 connected by point to point communication links 20. In the 3D computer 16 there is a need for routing data communications through the network of connections from one node to another, or from many nodes to many nodes in parallel. This data routing is a normal function during the operation of the machine.

Assume that in a given situation a higher order language program for the 3 D computer 16 calls for two data values stored in different nodes to be operated upon together. Then, the compiler 22 located in a control module 24 must arrange for one value to be routed from its current node 18 to the other node 18. In particular, the compiler 22 must arrange for the routing of a value from a source node 26 to a destination node 28, as shown in FIG. 4.

In accordance with the present invention, the control module 24 includes a routing program 30 which implements the techniques of the present invention described above. Initially, the hardware shown in FIG. 4 is represented as a mixed graph as shown in FIG. 5. The nodes of the machine where data values reside are represented as graph nodes 32, and the wires connecting nodes together are represented as graph edges 34. In this case, the number of nodes is potentially very large; for example, in a 128 by 128 processor version of the 3 D computer, the number of nodes is 16,384. This number of nodes is so large that it is not feasible in this situation to apply the technique of the present invention directly to the entire 3 D array due to the extremely large number of computations which would be required.

Fortunately, the interconnection topology of the 3 D computer 16, like most array processors, is very regular. In the 3 D computer 16 the basic topology can be represented as a simple three dimensional, six-nearest-neighbor mesh. We can take advantage of the symmetry and regularity in the 3 D computer by applying the methods of the present invention shown in FIGS. 2A and 2B to the local topology pattern in the neighborhood around a single processor. A simple 2×2×2 neighborhood of only eight nodes suffices for the this specific example, as shown in FIG. 4.

By taking advantage of symmetry, this neighborhood can then be used to build tables that are indexed by the relative position (offset) between the source and destination nodes. These tables can be applied to any processor in the system or to a given set of rows or columns, or to all of the processors simultaneously. In this way, by enumerating all acyclic paths in a local neighborhood, the results can be applied to other areas of the processor to efficiently achieve the enumeration of required paths for any given node without the necessity of the computationally expensive task of performing the enumeration of all acyclic paths for all (16,384) nodes.

Within one wafer, for example the destination wafer 36, or the source wafer 38, the bidirectional point to point links 20 in the 3 D computer 16 hardware, are represented as undirected edges in the mixed graph, since they can be used in either direction. As shown in FIG. 5, the paths 34 without arrows are bidirectional. In the 3 D computer 16, the vertical connections 20 between corresponding nodes on the wafers are implemented as bidirectional buses. These buses can be represented as directed edges in the mixed graph between corresponding nodes directed from nodes on the source wafer to nodes on the destination wafer. In FIG. 5 this is indicated by the lines 34 having upward arrows. It will be appreciated that it is convenient to use directed edges for these bidirectional edges because it narrows the search space for the process to consider only paths from the source wafer to the destination wafer, which is more efficient than considering paths that go back and forth between the two wafers needlessly.

The input file corresponding to the mixed graph in FIG. 5 is shown in FIG. 6. The first entry is the number of nodes; the second is the ID number of the source node; the third entry is the number of destination nodes; the fourth entry is the ID number of the destination node; and the following entries define all of the directed and undirected edges. For example, when the program for enumerating acyclic paths 30 reads the line "1-2" from the input file in FIG. 6, it makes an entry in the internal array variable, "C[K=0, I=1, J=2]". This entry means before the first iteration of the main loop of the program (K=0), there is a path consisting of a single edge with no intermediate nodes from I=node number 1 to J=node number 2. Since "1-2" represents an undirected edge, the program will also make an entry in "C[K=0, I=2, J=1]", which corresponds to the same edge in the opposite direction. It should be noted in a more complex example, there might be additional hardware components such as switches that steer data values along different communication links without storing the data. These switches would also be represented as nodes of the mixed graph but the switch nodes would never be considered as a final destination for a value during routing.

Using the acyclic paths program 30 discussed above, we can find all the useful paths from the source of the data, node number 1, to the destination of the data, node number 8, and store this path information as a list in a table indexed by the source and destination nodes. This list corresponds to the value of the internal array variable "C[K=8, I=1, J=8]" at the completion of the program, where K=8 is the number of nodes in the graph, I=1 is the source node, and J=8 is the destination of interest.

For this example, there are a total of 12 paths, as shown in the output file of FIG. 7. Each path is defined by a list of edges, and each edge is defined by a pair of node ID numbers in parenthesis. For example, the first entry indicates a path from node number 1 to destination 8 which consists of the path defined by first moving from node number 1 to node number 3, and then from node number 3 to node number 4, and then from node number 4 to node number 8.

When the need for an interprocessor communication path arises during the compilation (or execution) of a high order language program for the 3 D computer 16, this table can be quickly consulted by the control module 24 to find a legal path. Since multiple paths are available, the problem of choosing the "best" path arises. A simple approach to handle this situation is to identify some "goodness" heuristic for different paths, such as path length, and then sort each list of paths according to the decreasing goodness. Then, the first available path on the list can simply be chosen each time the table is consulted.

It will be appreciated from the foregoing that the system and techniques of the present invention can be implemented in a wide variety of applications besides the 3 D computer discussed above. Also, it can be seen that the present invention provides a fast and efficient technique for enumerating all acyclic paths in information processing systems in general, with particular usefulness in array reconfiguration and fault tolerance applications. Those skilled in the art can appreciate that other advantages can be obtained from the use of this invention and that modification may be made without departing from the true spirit of the invention after studying the specification, drawings, and following claims.

What is claimed is:

1. In an information processing system having N nodes and a plurality of used and unused information paths between said nodes, said paths including both unidirectional and bidirectional paths, a method for reconfiguring said information processing system to use at least one of said unused paths, said method comprising the steps of:
   (a) providing a list of said paths between nodes $V_n$ which are edges, edges being paths between two nodes which have no intermediate nodes between them;
   (b) for a given source node I, and one or more given destination nodes J, where the source node is not one of the destination nodes, using the edge data from step a) to determine acyclic paths C from the source node I to the destination nodes J going through nodes numbered less than or equal to K as the union of a first set comprising paths from I to J passing through nodes numbered less than or equal to K−1 and a second set comprising the concatenation of the set of paths from node I to node K passing through nodes numbered less than or equal to K−1, and the set of paths from node K to node J passing through nodes numbered less than or equal to K−1, where K is the highest number of the nodes which a path passes through from the source to the destination, and K is initially set to one;
   (c) eliminating paths which are redundant or cyclic;
   (d) generating a data structure containing said acyclic paths C; and
   (e) routing said information in said information processing system along one of said paths in said data structure.

2. The method of claim 1 wherein step (b) further comprises the steps of:
   (f) assigning a variable K to represent an intermediate node, $V_K$, on paths between nodes, said paths not being necessarily restricted to paths between given source nodes and given destination nodes;
   (g) assigning a variable I to represent a source node, $V_I$, on a path between nodes, said path not being necessarily restricted to paths between given source nodes and given destination nodes;
   (h) assigning a variable J to represent a destination node, $V_J$, on a path between nodes, said path not being necessarily restricted to paths between given source nodes and given destination nodes;
   (i) for each set of paths defined by the same source node and each other possible destination node, $V_J$ of the mixed graph:

(j) repeating steps (b),(c),(g) and (h) for each set of paths defined by the same source node and each other possible destination node, $V_J$, of the mixed graph; and (k) repeating steps (b),(c),(f),(g),(h),(i) and (j) incrementing the value of variable K by 1 each time until K equals N.

3. The method of claim 1 wherein the step of routing further comprises the step of:

choosing a path from said data structure which defines a path from a source node to a destination node which avoids an unavailable node in said information processor.

4. The method of claim 1 further comprising steps of:

performing steps a–e for a local area of said information processing system, said local area having a topology which is repeated throughout said processor;

said step (d) further including the step of indexing said paths based on positions which said local area with respect to said source and destination nodes, said data structure containing said paths defined by said indexes; and using said data structure for a local region to find paths in other local regions of said processor.

5. In an information processor having N nodes and a plurality of information paths between said nodes, a method for routing information between nodes, said method comprising the steps (a) determining which of said paths between nodes are edges, edges being paths between two nodes which have no intermediate nodes between them;

(b) for a given source node I, and one or more given destination nodes J, where the source node is not one of the destination nodes, using the edge data from element (a) to determine acyclic paths C from the source node I to the destination nodes J going through nodes numbered less than or equal to K as the union of a first set comprising paths from I to J passing through nodes numbered less than or equal to K−1, and a second set comprising the concatenation of the set of paths from node I to node K passing through nodes numbered less than or equal to K−1, and the set of paths from node K to node J passing through nodes numbered less than or equal to K−1 where K is the highest number of the nodes which a path passes through from the source to the destination, and K is initially set to one; eliminating paths which are redundant or cyclic;

(c) generating a data structure having a table containing said acyclic paths; and (d) routing said information in said information processing system along one of said paths in said table.

6. The method of claim 5 wherein step (b) further comprises the steps of:

(f) assigning a variable K to represent an intermediate node, $V_K$, on paths between nodes, said paths not being necessarily restricted to paths between given source nodes and given destination nodes;

(g) assigning a variable I to represent a source node, $V_I$, on a path between nodes, said path not being necessarily restricted to paths between given source nodes and given destination nodes;

(h) assigning a variable J to represent a destination node, $V_J$, on a path between nodes, said path not being necessarily restricted to paths between given source nodes and given destination nodes;

(i) repeating steps (b),(c), and (h) for each set of paths defined by the same source node and each other possible destination node, $V_J$ of the mixed graph:

(j) repeating steps (b),(c),(g) and (h) and (i) from each possible source node, $V_I$, of the mixed graph; and (k) repeating steps (b),(c),(f),(g),(h),(i) and (j) incrementing the value of variable K by 1 each time until K equals N.

7. In a fault tolerant computer, said computer having N nodes, some nodes comprising spares, and a plurality of used and unused information paths between said nodes, said paths including both unidirectional an bidirectional paths, a method for reconfiguring said fault tolerant computer to use at least one of said spare nodes or one of said unused paths, said method comprising the steps of:

(a) providing a list of said paths between nodes which are edges, edges being paths between two nodes which have no intermediate nodes between them;

(b) for a given source node, and one or more given destination nodes, where the source node is not one of the destination nodes, using the edge data from step (a) to determine acyclic paths from the source node to the destination nodes; by:

(c) assigning a variable K to represent an intermediate node, $V_K$, on paths between nodes, said paths not being necessarily restricted to paths between given source nodes and given destination nodes;

(d) assigning a variable I to represent a source node, $V_I$, on a path between nodes, said path not being necessarily restricted to paths between given source nodes and given destination nodes;

(e) assigning a variable J to represent a destination node, $V_J$, on a path between nodes, said path not being necessarily restricted to paths between given source nodes and given destination nodes;

(f) for a source node, $V_I$, and a destination node, $V_J$, and an intermediate node, $V_K$, where $V_I$ and $V_J$ are not the same node, determining acyclic paths from the source node to the destination node going through nodes numbered less than or equal to K as the union of a first set comprising paths from the source node to the destination node passing through nodes numbered less than or equal to K−1, and a second set comprising a concatenation of the set of paths from the source node to node K passing through nodes numbered less than or equal to K−1, and the set of paths from node K to the destination node passing through nodes numbered less than or equal to K−1, where K is the highest number of the nodes which the path passes through:

(g) eliminating paths from step (f) which are redundant or acyclic:

(h) repeating steps (e),(f), & (g) for each set of paths defined by the same source node and each other possible destination node, $V_J$ of the mixed graph;

(i) repeating steps (d),(e),(f),(g), & (h) for each possible source node, $V_I$, of the mixed graph; and (j) repeating steps (c),(d),(e),(f),(g),(h) & (i) incrementing the value of variable K by 1 each time until K equals N;

(k) generating a data structure such as a table containing said acyclic paths; and (l) reconfiguring said fault tolerant computer by altering the flow of information to use one of said paths in said table which utilizes one of said spare nodes.

8. A system for routing information in an information processor having N nodes and a plurality of information paths between said nodes, said system comprising:

means for determining which of said paths between nodes are edges, edges being paths between two nodes which have no intermediate nodes between them;

for a given source node, and one or more given destination nodes, where the source node is not one of the destination nodes, means for using the said determined edges data to determine acyclic paths from the source node to the destination nodes, said means including:

means for assigning a variable K to represent in intermediate node, $V_K$ on paths between nodes, said paths not being necessarily restricted to paths between given source nodes and given destination nodes;

means for assigning a variable I to represent a source node, $V_I$, on a path between nodes, said path not being necessarily restricted to paths between given source nodes and given destination nodes;

means for assigning a variable J to represent a destination node, $V_J$, on a path between nodes, said path not being necessarily restricted to paths between given source nodes and given destination nodes;

for a source node, $V_I$, and a destination node, $V_J$, and an intermediate node, $V_K$, where $V_I$ and $V_J$ are not the same node, means for determining acyclic paths from the source node to the destination node going through nodes numbered less than or equal to K as the union of a first set comprising paths from the source node to the destination node passing through nodes numbered less than or equal to K−1, and a second set comprising a concatenation of the set of paths from the source node to node K passing through nodes numbered less than or equal to K−1, and the set paths from node K to the destination node passing through nodes numbered less than or equal to K−1, where K is the highest number of the nodes which the path passes through; and means for eliminating paths from said acyclic paths which are redundant or cyclic;

means for generating a data structure having a table containing said acyclic paths; and means for routing said information in said information processing system along one of said paths in said table.

9. The system of claim 8 wherein said information processor is a fault tolerant computer and said nodes include spare nodes.

10. In an information processor having N nodes and a plurality of used and unused information paths between said nodes, said paths including both unidirectional and bidirectional paths, a system for reconfiguring said information processor to use at least one of said unused paths, said system comprising:

means for providing a list of said paths between nodes which are edges, edges being paths between two nodes which haven o intermediate nodes between them;

means for providing a source node, and one or more destination nodes, where the source node is not one of the destination nodes;

means for determining acyclic paths from the source node to the destination nodes including for a source node I, and for a destination node J, where node I does not equal J, means for determining acyclic paths C from source I to destination J going through nodes numbered less than or equal to K as the union of a first set comprising paths from I to J passing through nodes numbered less than or equal to K−1, and a second set comprising the concatenation of the set of paths from node I to node K passing through nodes numbered less than or equal to K−1, and the set paths from node K to node J passing through nodes numbered less than or equal to K−1, where K is the highest number of the nodes which a path passes through from the source to the destination, and K is initially set to one;

means for eliminating paths not determined by said determining means to be acyclic;

means for generating a data structure including a table containing said acyclic paths; and means for reconfiguring said information processing system by altering the flow of information within said processor to use one of said paths in said table.

11. The system of claim 10 wherein said means for reconfiguring further comprises means for choosing a path from said table which defines a path from a source node to a destination node which avoids an unavailable node in said information processor.

12. The system of claim 10 wherein said means for generating a table generates a table for only a local area of said information processor and wherein said means for generating a table indexes said based on positions within said local area with respect to said source and destination nodes, said table containing said paths defined by said indexes; said system further comprising means for using said table for a local region to find paths in other local regions of said processor.

13. In an information processor having N nodes and a plurality of used and unused information paths between said nodes, said paths including both unidirectional and bidirectional paths, a system for reconfiguring said information processor to use at least one of said unused paths, said method comprising the steps of:

means for providing a list of said paths between nodes $V_N$ which are edges, edges being paths between two nodes which have no intermediate nodes between them;

means for assigning a variable I to represent source nodes $V_1$ through $V_N$;

means for assigning variable J to represent destination nodes $V_1$ through $V_N$;

for a source node I, and for a destination node J, where node I does not equal J, means for determining acyclic paths C from source I to destination J going through nodes numbered less than or equal to K as the union of a first set comprising paths from I to J passing through nodes numbered less than or equal to K−1, and a second set comprising the concatenation of the set of paths from node I to node K, passing through nodes numbered less than or equal to K−1, and the set of paths from node K to node J passing through nodes numbered less than or equal to K−1, where K is the highest number of the nodes which a path passes through from the source to the destination, and K is initially set to one;

means for eliminating paths which are redundant or cyclic;

for means for generating a table of said acyclic paths C; and means for reconfiguring said information processing system by altering the flow of information within said processor to use one of said paths in said table.

* * * * *